(12) United States Patent
Hirawaki

(10) Patent No.: US 11,845,333 B2
(45) Date of Patent: Dec. 19, 2023

(54) CONTAINER HOLDING MECHANISM FOR FUEL CELL VEHICLE

(71) Applicant: SUBARU CORPORATION, Tokyo (JP)

(72) Inventor: Aiko Hirawaki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 122 days.

(21) Appl. No.: 17/383,677

(22) Filed: Jul. 23, 2021

(65) Prior Publication Data

US 2022/0041053 A1  Feb. 10, 2022

(30) Foreign Application Priority Data

Aug. 5, 2020 (JP) ................. 2020-133000

(51) Int. Cl.
*B60K 1/04* (2019.01)
*B60K 15/07* (2006.01)
*H01M 8/04082* (2016.01)
*B60L 50/71* (2019.01)
*B60K 15/03* (2006.01)

(52) U.S. Cl.
CPC ............ *B60K 15/07* (2013.01); *B60K 1/04* (2013.01); *B60K 15/03006* (2013.01); *B60L 50/71* (2019.02); *H01M 8/04201* (2013.01); *H01M 2250/20* (2013.01)

(58) Field of Classification Search
CPC .... B60K 15/07; B60K 1/04; B60K 15/03006; B60L 50/71; H01M 8/04201; H01M 2250/20; Y02E 60/50
See application file for complete search history.

(56) References Cited

U.S. PATENT DOCUMENTS

| | | | | |
|---|---|---|---|---|
| 7,441,615 | B2* | 10/2008 | Borroni-Bird | B62D 21/10 180/402 |
| 10,300,788 | B2 | 5/2019 | Nishiumi et al. | |
| 10,569,646 | B2* | 2/2020 | Mori | B60L 50/72 |
| 2018/0251023 | A1 | 9/2018 | Nishiumi et al. | |

FOREIGN PATENT DOCUMENTS

| | | |
|---|---|---|
| JP | 2018-138396 A | 9/2018 |
| JP | 2018-144509 A | 9/2018 |

* cited by examiner

*Primary Examiner* — Jason D Shanske
*Assistant Examiner* — James J Triggs
(74) *Attorney, Agent, or Firm* — Smith, Gambrell & Russell, LLP

(57) ABSTRACT

A container holding mechanism is applied to a fuel cell vehicle including a driving mechanism capable of driving rear wheels and disposed on a side of the rear wheels. The container holding mechanism includes a first hydrogen gas, a second hydrogen gas, a third hydrogen gas container, and a moving unit. The first hydrogen gas container is disposed behind a rear drive shaft. The second hydrogen gas container is disposed in front of the rear drive shaft. The third hydrogen gas container disposed in parallel with the second hydrogen gas container in front of the rear drive shaft. The moving unit is configured to move the driving mechanism pushed out by the first hydrogen gas container in collision in such a manner that the driving mechanism avoids the second hydrogen gas container and the third hydrogen gas container.

10 Claims, 8 Drawing Sheets and 
CONTAINER HOLDING MECHANISM FOR FUEL CELL VEHICLE

CROSS-REFERENCE TO RELATED APPLICATIONS

The present application claims priority from Japanese Patent Application No. 2020-133000 filed on Aug. 5, 2020, the entire contents of which are hereby incorporated by reference.

BACKGROUND

The disclosure relates to a fuel cell vehicle on which a hydrogen gas container is mounted, and relates to, for example, a vehicle technique in which a drive unit that drives a drive shaft of rear wheels is disposed in a rear portion of the vehicle.

Automobiles are now notable transportation tools in a modern society, and various vehicles move on roads in a daily life. In recent years, attention is given to a fuel cell vehicle on which a fuel cell, as a new battery that can replace a lead storage battery and a lithium ions battery, having comparatively small load with respect to the environment is mounted.

In such a fuel cell vehicle, a motor that is driven by electric power of the fuel cell, and a motor drive unit in which a driving mechanism that transmits a driving force of the motor to the drive shaft of the rear wheels is housed, are mounted. From a background of awareness of safety, for example, it is considered to prevent the motor drive unit from being broken when rear collision occurs (see Japanese Unexamined Patent Application Publication (JP-A) No. 2018-138396 and JP-A No. 2018-144509).

SUMMARY

An aspect of the disclosure provides a container holding mechanism for a fuel cell vehicle. The vehicle includes a driving mechanism capable of driving rear wheels and disposed on a side of the rear wheels. The container holding mechanism includes a first hydrogen gas, a second hydrogen gas, a third hydrogen gas container, and a moving unit. The first hydrogen gas container is disposed behind a rear drive shaft. The second hydrogen gas container is disposed in front of the rear drive shaft. The third hydrogen gas container disposed in parallel with the second hydrogen gas container in front of the rear drive shaft. The moving unit is configured to move the driving mechanism pushed out by the first hydrogen gas container in collision in such a manner that the driving mechanism avoids the second hydrogen gas container and the third hydrogen gas container.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
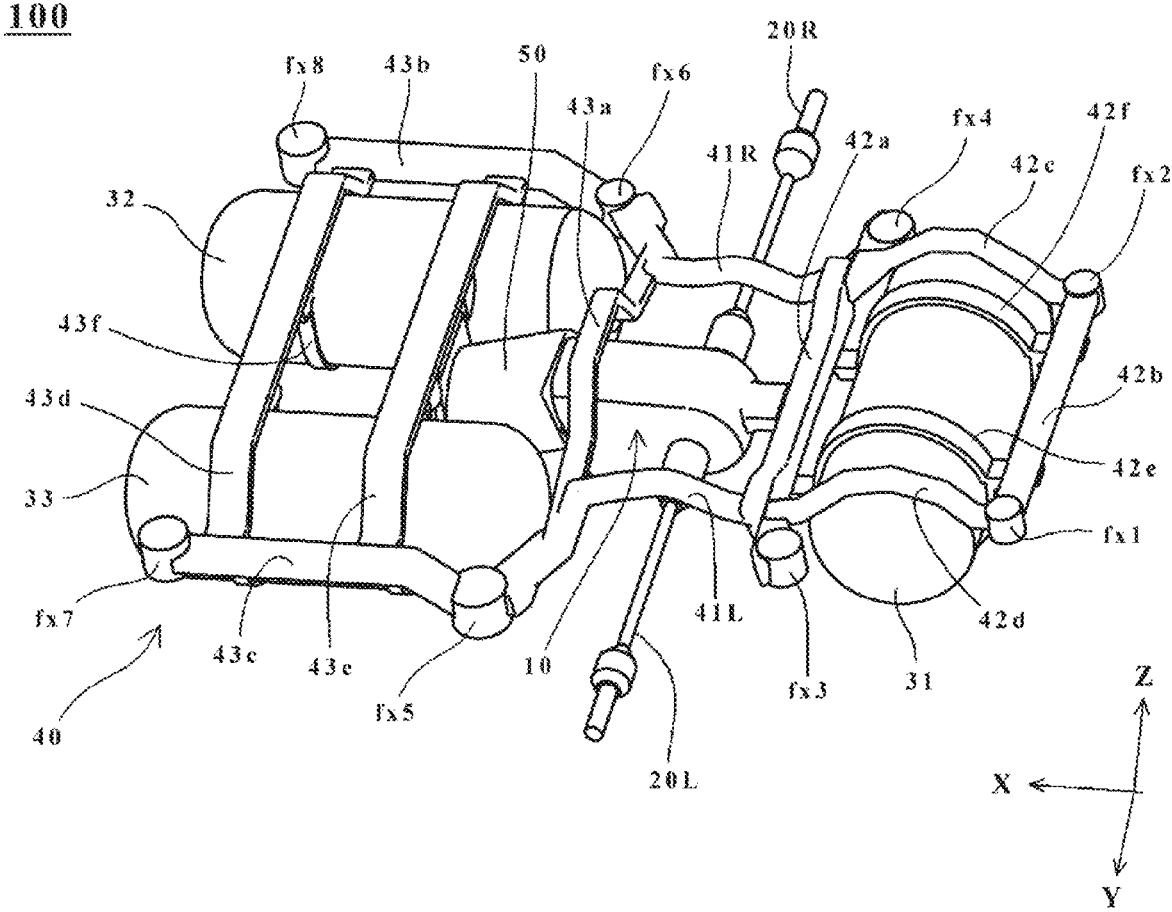
FIG. 1 is an external perspective view of a container holding mechanism in a fuel cell vehicle according to an embodiment.

It may not be true that current technologies (which are not limited to JP-A No. 2018-138396 and JP-A No. 2018-144509) appropriately satisfy market's demands, and have the following problems.

In other words, in both of JP-A No. 2018-138396 and JP-A No. 2018-144509, an exposure of a high voltage site by a collision load in a collision initial stage is merely prevented, and contact between a motor drive unit and a fuel container is premised.

Accordingly, according to JP-A No. 2018-138396 and JP-A No. 2018-144509, a state where the high voltage site is exposed can be avoided. However, there is a possibility that a drive system such as a motor drive unit in contact with a fuel tank receives an unallowable damage. Meanwhile, even after the rear collision such as those described in JP-A No. 2018-138396 and JP-A No. 2018-144509, for example, it can be said that more safety feeling by an occupant can be obtained if an influence to the drive system remains at a low level.

It is desirable to provide a technique capable of reducing a damage to a driving mechanism (motor drive unit) in rear collision, for example, in a fuel cell vehicle in which a plurality of hydrogen gas containers are disposed.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the following description, for convenience, a vehicle height direction of a fuel cell vehicle is defined as a Z direction, a vehicle longitudinal direction of the fuel cell vehicle is defined as an X direction, and a vehicle width direction of the fuel cell vehicle orthogonal to the Z direction and the X direction is defined as a Y direction. Needless to say, however, this definition of the directions is not to affect the disclosure and is not to unduly narrow the scope of the appended claims. Regarding configurations other than those described in detail below, elemental technologies and configurations relating to known fuel cell vehicles including JP-A No. 2018-138396 and JP-A No. 2018-144509 may be appropriately supplemented.

Container Holding Mechanism 100

A configuration of a container holding mechanism 100 to be mounted on a fuel cell vehicle (which will be described later) in the embodiment will be firstly described with reference to FIGS. 1 to 4. The container holding mechanism 100 in the present embodiment is mounted on a fuel cell vehicle (FCV), for example. An FCV as an example will be described hereinafter as an embodiment of the disclosure. It is not that the disclosure is not limited to the FCV, but may be applied to, for example, a vehicle on which a container for high-pressure gas, such as liquefied natural gas, is mounted.

In the present embodiment, the container holding mechanism 100 is mounted on a fuel cell vehicle including, on a rear wheel side, a driving mechanism 10 capable of driving at least rear wheels. In one example, similar to the motor drive unit disclosed in JP-A No. 2018-138396, a publicly known fuel cell stack (which is not illustrated) is disposed at a front portion of the vehicle, and the driving mechanism 10 is provided in a rear portion of the vehicle so as to join rear drive shafts (20R, 20L).

The driving mechanism 10 includes a publicly known electric motor, and a publicly known power transmission mechanism, such as a transmission and a decelerator, that transmits power from the electric motor. In other words, the driving mechanism 10 of this embodiment is a rear wheel drive vehicle in which a driving force from the electric motor is transmitted to the rear wheels. However, the driving mechanism 10 is not limited to this, and may be, for example, a four-wheel drive system having a driving mechanism also in the front wheel side. It is noted that the driving mechanism 10 in the present embodiment is mounted to a vehicle body frame with a publicly known general structure.

Moreover, a drive motor 50 is coupled to a front of the driving mechanism 10. The drive motor 50 applies a driving force to drive shafts (20R, 20L), for example. Example of the drive motor 50 include a publicly known electric motor to be mounted on the vehicle. The drive motor 50 is fixed to a tank mounting frame 40 (for example, a rear portion 43a of a third support 43) via a motor support (publicly known mount bracket or the like), which will be described later.

It is noted that the driving mechanism 10 is fixed with a bolt so as to be coupled to the tank mounting frame 40 (for example, a front portion 42a of a second support 42), which will be described later, via a rear support 10A. Examples of the rear support 10A include a publicly known coupling mechanism, such as a plurality (two) of mount bushes that are arranged in the Y direction.

A fuel cell to be mounted on a fuel cell vehicle in the present embodiment receives supply of hydrogen gas fuel from a hydrogen gas container with which high-pressure hydrogen gas is filled, for example. In the present embodiment, a first hydrogen gas container 31, a second hydrogen gas container 32, and a third hydrogen gas container 33 are mounted on the fuel cell vehicle. It is noted that, in the present embodiment, the three hydrogen gas containers are disposed in the vehicle. It is noted that the embodiment is not limited thereto, but another hydrogen gas container may be provided.

The first hydrogen gas container 31 is disposed at a rear side relative to the rear drive shafts (20R, 20L). As illustrated in FIGS. 1 to 4 and the like, the first hydrogen gas container 31 in the present embodiment is disposed such that a longitudinal direction of the container is along the vehicle width direction (the Y direction). As for a structure and materials of such the first hydrogen gas container 31, a publicly known in-vehicle use hydrogen gas container is applicable (the same applies to the second hydrogen gas container 32 and the third hydrogen gas container 33, which will be described later).

The second hydrogen gas container 32 is disposed at a front side relative to the rear drive shafts (20R, 20L). In other words, the second hydrogen gas container 32 in the present embodiment is disposed at an opposite side of the first hydrogen gas container 31 using the rear drive shafts (20R, 20L) as a reference. Moreover, as apparent from the illustration, the second hydrogen gas container 32 in the present embodiment is disposed along the vehicle longitudinal direction (the X direction) such that a longitudinal direction of the container is orthogonal to the longitudinal direction of the first hydrogen gas container 31.

The third hydrogen gas container 33 is, similar to the second hydrogen gas container 32, disposed at the front side relative to the rear drive shafts (20R, 20L). In other words, the third hydrogen gas container 33 in the present embodiment is also disposed at the opposite side of the first hydrogen gas container 31 using the rear drive shafts (20R, 20L) as the reference. Moreover, as apparent from the illustration, the third hydrogen gas container 33 in the present embodiment is arranged along the vehicle longitudinal direction (the X direction) such that a predetermined gap (safe space) is present with the second hydrogen gas container 32 and a longitudinal direction of the container is in parallel with the longitudinal direction of the second hydrogen gas container 32.

The second hydrogen gas container 32 and the third hydrogen gas container 33 in the present embodiment are disposed in the fuel cell vehicle with a predetermined gap therebetween in this manner, and the drive motor 50 disposed at the front side of the driving mechanism 10 is disposed within the predetermined gap. It is noted that the size of the "predetermined gap" is not specially limited as long as a part of the driving mechanism 10 can be inserted, and various designs may be made depending on the size and the layout of the vehicle.

Moreover, both of the second hydrogen gas container 32 and the third hydrogen gas container 33 are arranged in the direction orthogonal to the first hydrogen gas container 31. The angel is not necessarily 90 degrees. The second hydrogen gas container 32 and the third hydrogen gas container 33 may be disposed (arranged) along a direction intersecting with the first hydrogen gas container 31.

Moving Unit

Next, with reference to FIGS. 1 to 4, a moving unit of the container holding mechanism 100 in the present embodiment will be described in details.

The moving unit in the present embodiment moves the driving mechanism 10 pushed out by the first hydrogen gas container 31 such that the driving mechanism 10 avoids the second hydrogen gas container 32 and the third hydrogen gas container 33 in collision such as rear collision, for example.

In one example, the moving unit in the present embodiment includes the tank mounting frame 40 that supports the first hydrogen gas container 31 to the third hydrogen gas container 33.

The tank mounting frame 40 is fixed to a publicly known vehicle body frame that passes through a floor surface of a vehicle body member via fixation units fx1 to fx8. It is noted that the structure of the vehicle body member is not specially limited, and for example, publicly known various vehicle body structures such as a frame structure and a monocoque structure may be applied. It is noted that, as a specific example of the fixation units fx1 to fx8, for example, a publicly known fasten technique to be applied to a vehicle such as the bolt fixation via a mount bush is applicable.

The tank mounting frame 40 in the present embodiment integrally supports the first hydrogen gas container 31, the second hydrogen gas container 32, and the third hydrogen gas container 33. In other words, the tank mounting frame 40 includes a first support 41, the second support 42, and the third support 43, which are structurally coupled to one another (such a configuration is called "integrally" in the present embodiment), and the three hydrogen gas containers are mounted on the vehicle body member via the tank mounting frame 40 having this coupling structure. It is noted that the first support 41, the second support 42, and the third support 43 may be molded and processed using a material of the same kind to attain the coupling structure, or may include materials of the different kinds and be coupled by welding and the like to attain the coupling structure.

In some embodiments, the tank mounting frame 40 may have rigidity relatively lower than that of the vehicle body member on which the driving mechanism 10 and the like are mounted. It is noted that "the rigidity is relatively low" in the present embodiment indicates that the rigidity of a site (the first supports 41R, 41L in the present example) that hardly causes a substantial problem when being deformed in accordance with the collision from the rear direction is set lower than that of a site to be protected from the collision. A specific method of reducing the rigidity can be implemented, for example, by using a material having a relative small modulus of elasticity, such as a Young's modulus, or in a case of the same material, by using a material having a relatively small plate thickness or by not using a cross-sectional structure having a large cross-sectional performance, such a rib shape or an H-shape.

Figure 2:
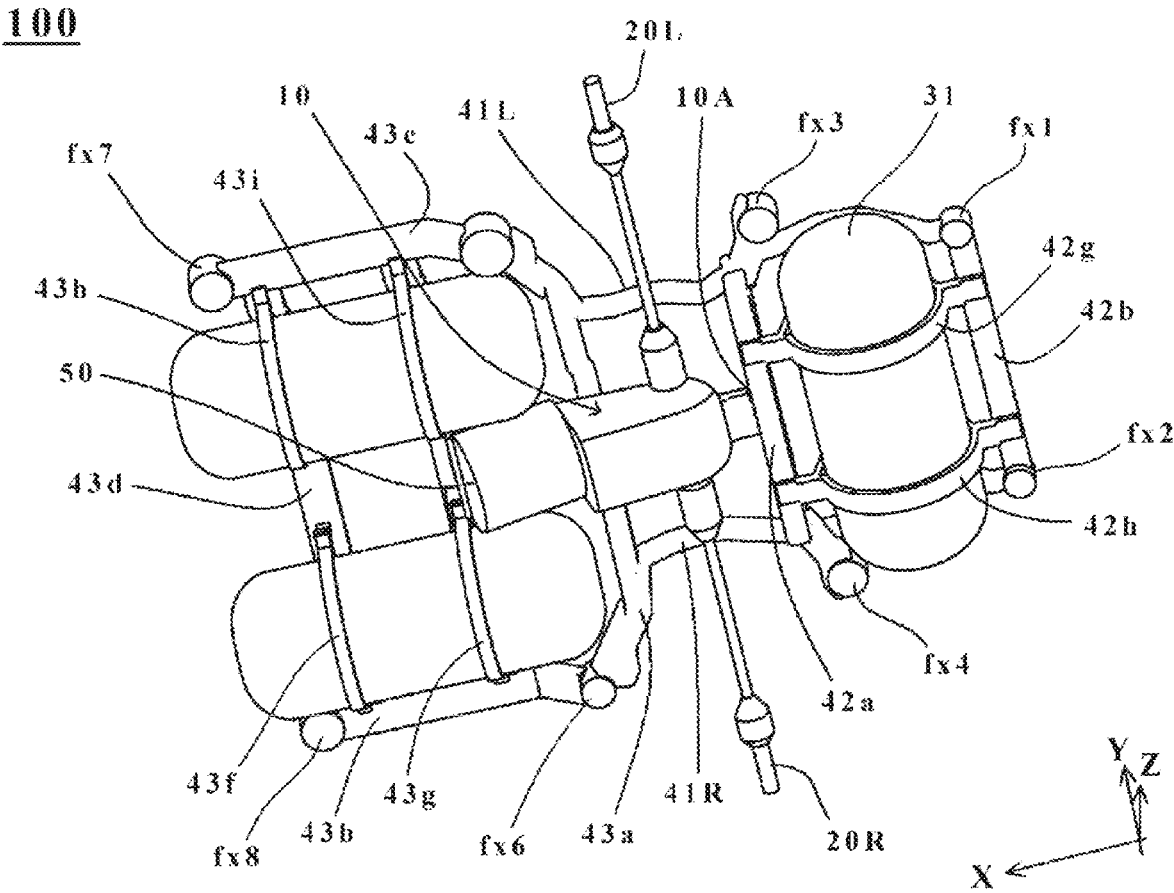
FIG. 2 is an external perspective view of the container holding mechanism according to the embodiment, seen from a bottom surface side.
Figure 3:
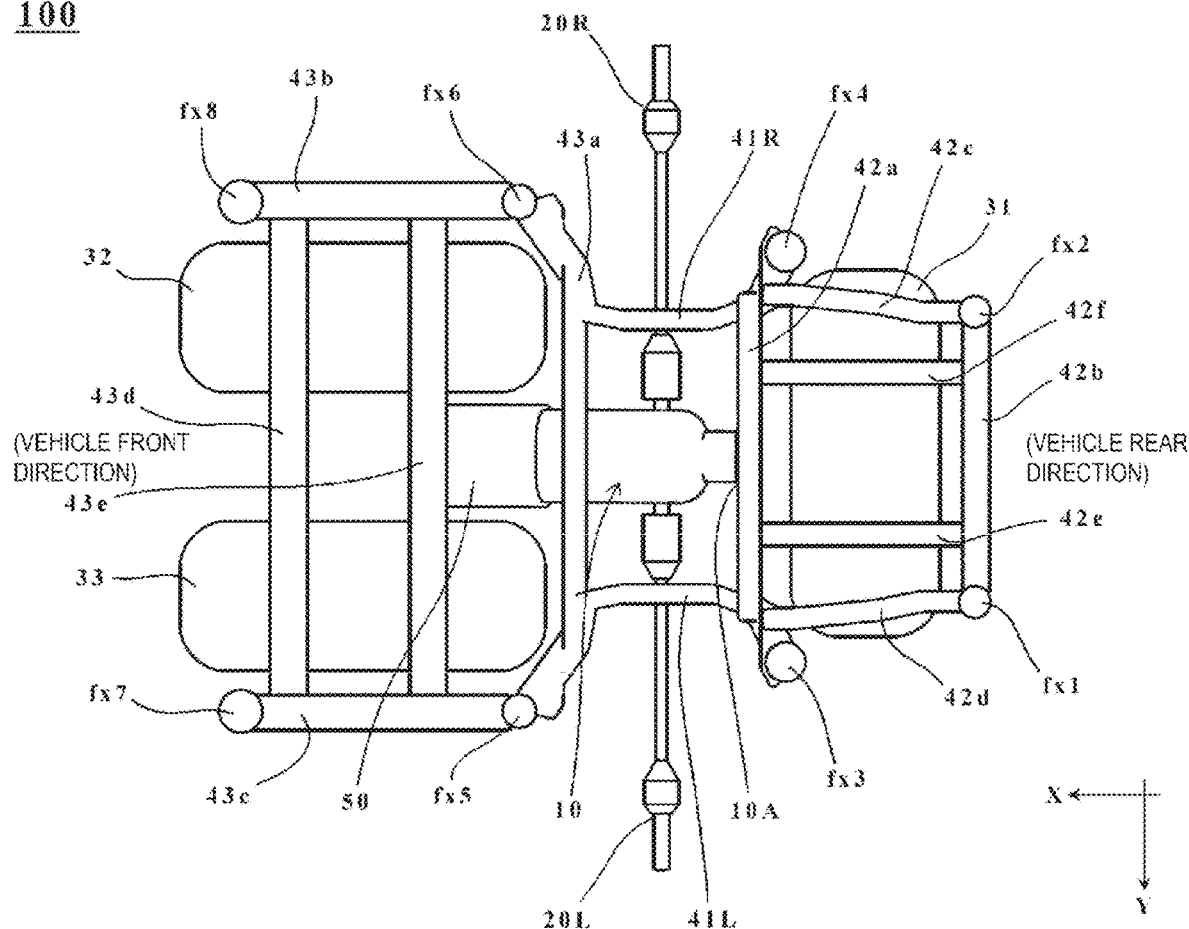
FIG. 3 is a top view of the container holding mechanism according to the embodiment.
Figure 4:
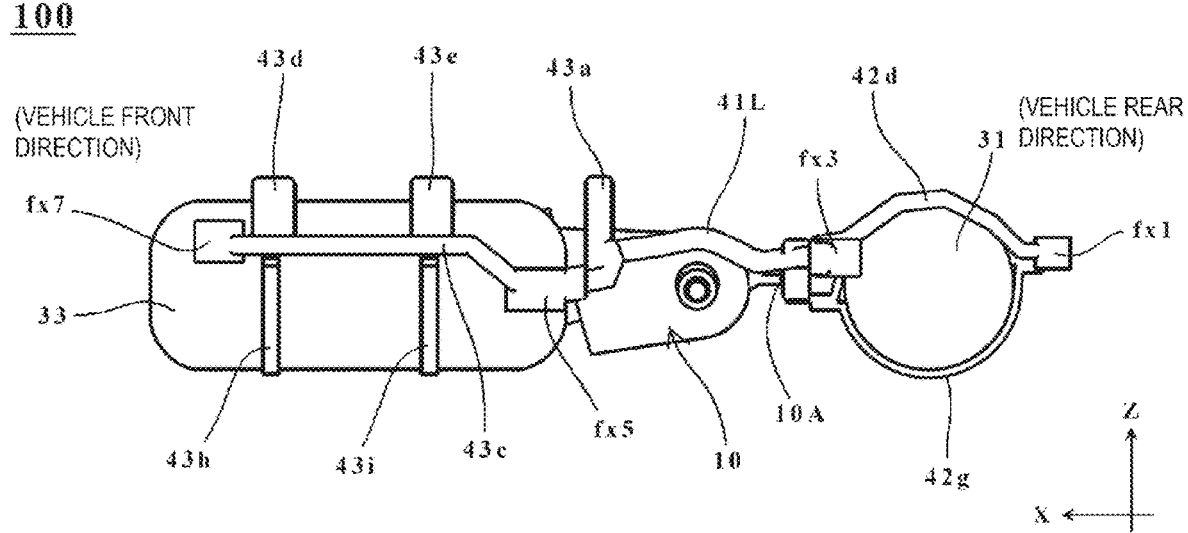
FIG. 4 is a side view of the container holding mechanism according to the embodiment.

The first support 41 is interposed between the second support 42 and the third support 43, which will be described later, and couples the second support 42 and the third support 43. As illustrated in FIGS. 1 to 3 and the like, the first support 41 in the present embodiment is disposed across each of the rear drive shafts (20R, 20L), and includes, for example, two bridge-like members 41R/41L each having a convex curbed portion in an upside direction (upper side in the Z direction).

The first support 41 has the rounded curbed portions in this manner so as to protrude upward in the Z direction. In one embodiment, the first support 41 may serve as a "first fragile portion" that is preferentially (primarily) deformed in the collision. It is noted that the first fragile portion in the present embodiment includes the first support 41 having the curbed portions, but is not limited this configuration. The first fragile portion may has a publicly known structure and include material having low rigidity so as to be preferentially deformed in the collision, for example. It is noted that, as will be described later, in the present embodiment, the breaking of the first fragile portion is also included in an aspect of the "deformation".

The second support 42 supports the first hydrogen gas container 31 via a first arch portion 42e and a second arch portion 42f, which will be described later. In one example, the second support 42 is a frame-shaped structure body (also referred to as a frame) including the front portion 42a that is coupled to the first support 41, a rear portion 42b that is disposed in the rear direction of the first hydrogen gas container 31 so as to face the front portion 42a, and a pair of side portions 42c/42d that respectively couple both ends of the front portion 42a to both ends of the rear portion 42b.

Moreover, the second support 42 includes the first arch portion 42e and the second arch portion 42f that are each stretched in an arch shape between the front portion 42a and the rear portion 42b, so as to press the upside of the first hydrogen gas container 31.

Moreover, as illustrated in FIGS. 1 to 4 and the like, the second support 42 includes a third arch portion 42g and a fourth arch portion 42h that are each stretched in an arch shape between the front portion 42a and the rear portion 42b along a bottom surface of the first hydrogen gas container 31.

As apparent from these drawings, the first hydrogen gas container 31 in the present embodiment is fixed with the second support 42 by being sandwiched by restraint bands (the first arch portion 42e, the second arch portion 42f, the third arch portion 42g, and the fourth arch portion 42h) including the upper and lower arch portions.

This allows the first hydrogen gas container 31 to be stably held with respect to motions and vibrations in the all directions during when the fuel cell vehicle is traveling.

The third support 43 has supports the second hydrogen gas container 32 and the third hydrogen gas container 33. In one example, the third support 43 is a U-character shaped structure body (also referred to as a U-shaped body) including the rear portion 43a that is coupled to the first support 41, arm portions 43b/43c that respectively extend forward in the vehicle longitudinal direction from both ends of the rear portion 43a in the vehicle width direction.

It is noted that, as described above, a predetermined gap (safe space) into which at least a part of the driving mechanism 10 is capable of being inserted is formed between the second hydrogen gas container 32 and the third hydrogen gas container 33, as will be described later. Accordingly, a distance between the arm portion 43b and the arm portion 43c in the present embodiment is set larger by the predetermined gap or more than the size in which an outer diameter of the second hydrogen gas container 32 and an outer diameter of the third hydrogen gas container 33 are added.

Moreover, the third support 43 includes a first bridge portion 43d and a second bridge portion 43e that are each stretched in an arch shape between the arm portion 43b and the arm portion 43c so as to press the upsides of the second hydrogen gas container 32 and the third hydrogen gas container 33.

Moreover, as illustrated in FIGS. 1 to 4 and the like, the third support 43 includes, along a bottom surface of the second hydrogen gas container 32, a restraint band portion 43f that is hung from the first bridge portion 43d and sandwiches the second hydrogen gas container 32 therein, and a restraint band portion 43g that is hung from the second bridge portion 43e and sandwiches the second hydrogen gas container 32 therein.

Similarly, the third support 43 includes, along a bottom surface of the third hydrogen gas container 33, a restraint band portion 43h that is hung from the first bridge portion 43d and sandwiches the third hydrogen gas container 33 therein, and a restraint band portion 43i that is hung from the second bridge portion 43e and sandwiches the third hydrogen gas container 33 therein.

As apparent from these drawings, the second hydrogen gas container 32 and the third hydrogen gas container 33 in the present embodiment are fixed with the third support 43 by being sandwiched by the upper and lower arch-shaped bands (the restraint band portion 43f to the restraint band portion 43i), similar to the first hydrogen gas container 31.

This allows the second hydrogen gas container 32 and the third hydrogen gas container 33 to be stably held with respect to motions and vibrations in the all directions during when the fuel cell vehicle is traveling.

The third support 43 in the present embodiment fixes the second hydrogen gas container 32 and the third hydrogen gas container 33 in this manner while forming the predetermined gap. Accordingly, the driving mechanism 10 pushed out by the first hydrogen gas container 31 in the rear collision, for example, can be moved to the predetermined gap, so that it is possible to prevent the driving mechanism 10 from coming into contact with the respective hydrogen gas containers.

State Transition in Rear Collision

Next, with reference to FIG. 5 and FIG. 6 as well, state transition of the container holding mechanism in the present embodiment in the rear collision will be described. There is a possibility that a vehicle rear portion of the fuel cell vehicle in the present embodiment is unintentionally collided by another vehicle (also referred to as rear collision). In this case, as illustrated in the drawings, an impact force by the rear collision is transmitted from the rear side of the vehicle also to the container holding mechanism 100.

Figure 5:
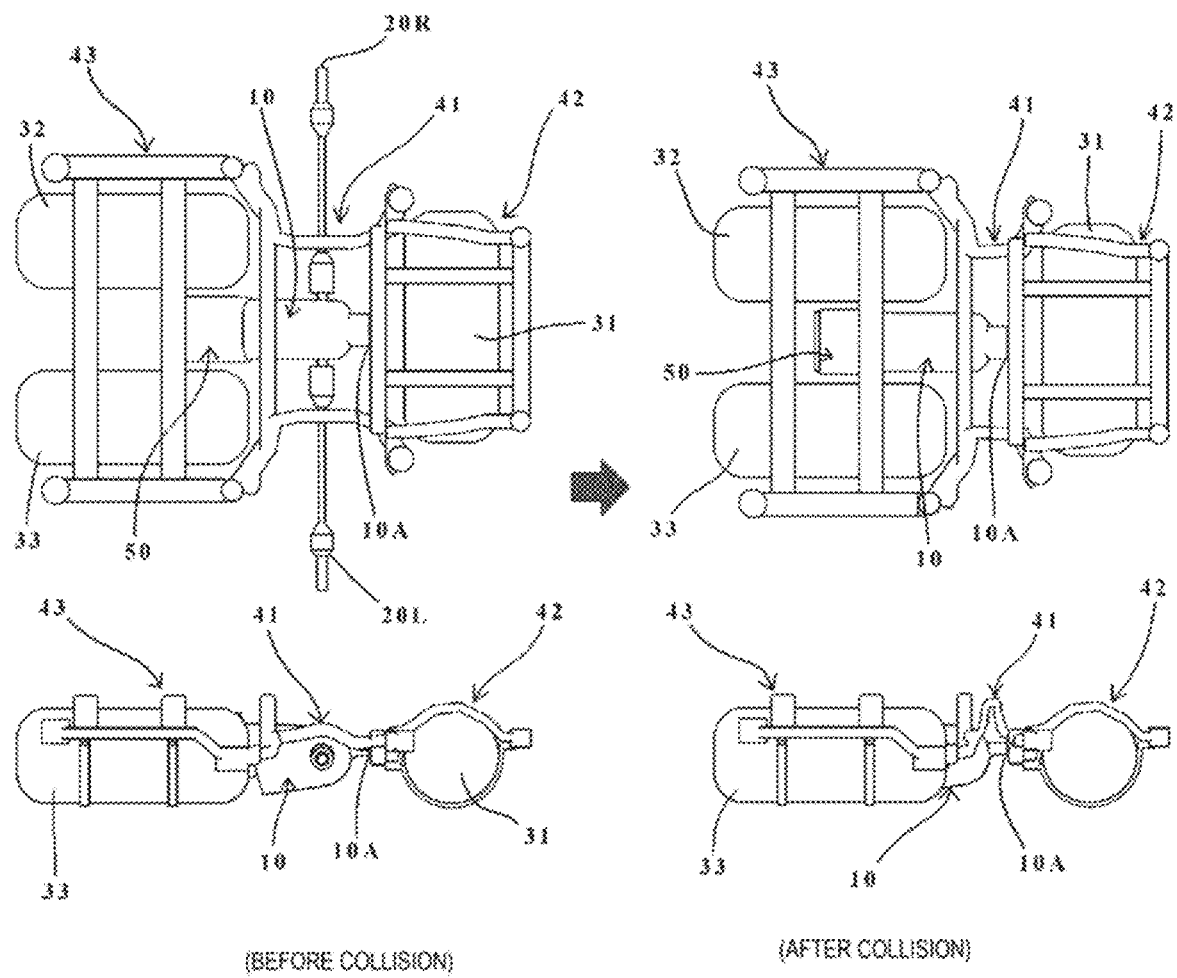
FIG. 5 is a schematic view illustrating state transition of the container holding mechanism in rear collision.
Figure 6:
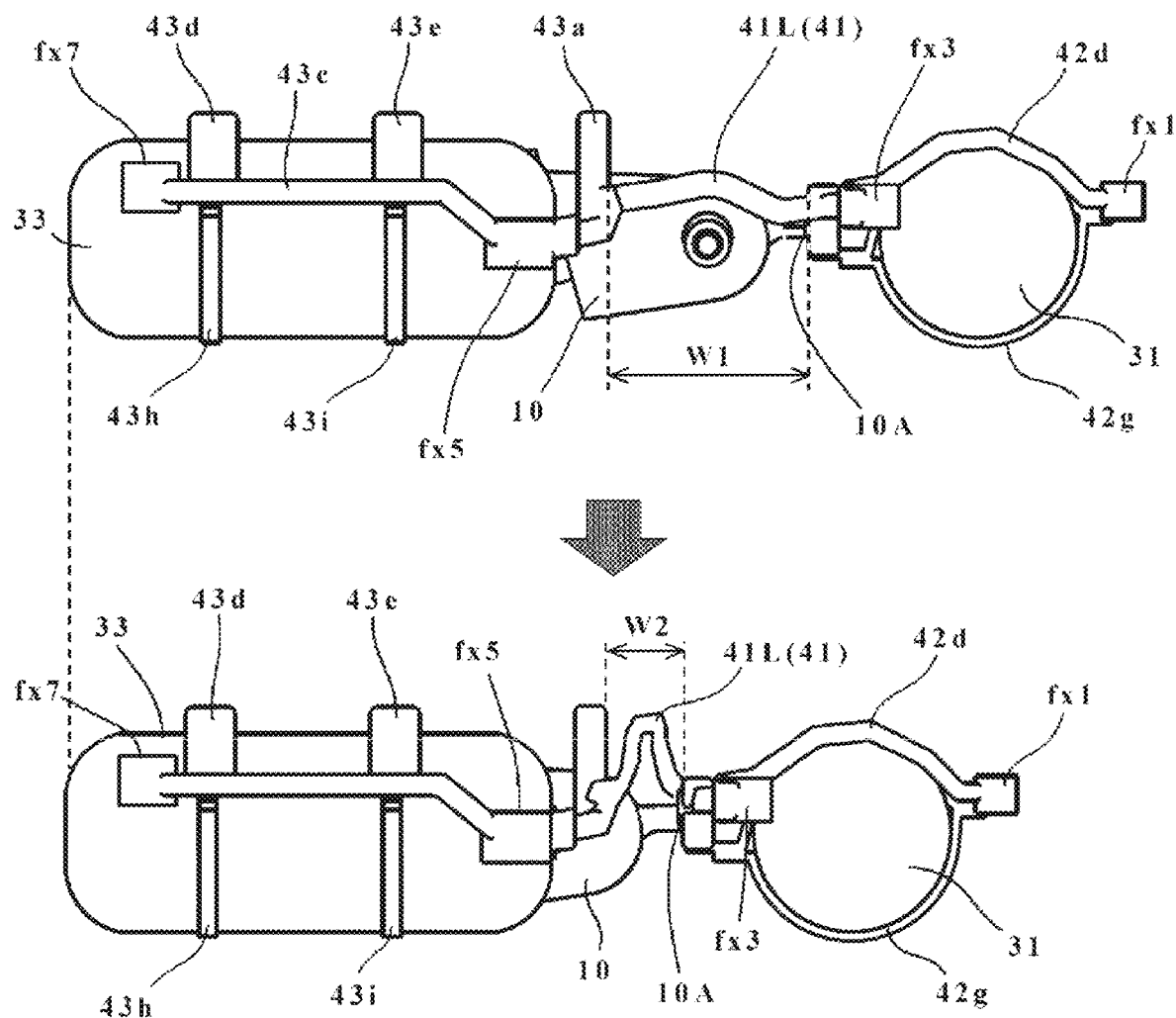
FIG. 6 is a schematic view illustrating state transition of the container holding mechanism before and after the collision.

As described above, as apparent from the comparison before and after the rear collision in FIG. 5, the first fragile portion (the first support 41) to be preferentially deformed (to be broken in the present example) in the collision is provided in the tank mounting frame 40 in the container holding mechanism 100 of the present embodiment. Accordingly, in the present embodiment, in the rear collision, the first fragile portion is primarily deformed, and the driving mechanism 10 pushed out by the first hydrogen gas container 31 is thus moved (evacuated) to the predetermined gap.

It is noted that, as described above, the tank mounting frame 40 in the present embodiment further includes a motor support (for example, a mount bracket) that supports the drive motor 50 coupled to the driving mechanism 10. In one embodiment, the motor support may serve as a "second fragile portion" that preferentially deforms (is broken in the present example) in the collision. In other words, the tank mounting frame 40 further includes a drive motor support that supports the drive motor 50 coupled to the driving mechanism 10, and a second fragile portion to be preferentially deformed in the collision may be provided in at least a part of the drive motor support.

The second fragile portion is a mount bracket deformable by an impact force in the collision in this manner, the second fragile portion (the mount bracket serving as the motor support) deforms (is broken in the present example) in the rear collision, so that the driving mechanism 10 can be pushed out forward and can turn in a θy direction centering on the rear support 10A (for example, a mount bush) with a self weight or the like. It is noted that, as for the extent of the strength of such a fixation unit to be designed, for example, an optimal value can be calculated using a publicly known analysis technique such as a rear collision test and a computer simulation in which AI is utilized.

Accordingly, it is possible to prevent the structure other than the first fragile portion (the first support 41) and the second fragile portion in the container holding mechanism 100 from being largely deformed and being brought into contact with other components and the like. In other words, for example, as illustrated in FIG. 6, it is also possible to attain a mounting position in the vehicle longitudinal direction of the third hydrogen gas container 33 after the collision, which is hardly changed from the mounting position before the collision.

At this time, as illustrated in the drawing, a length W1 in the vehicle longitudinal direction (the X direction) of the first fragile portion (the first support 41) is changed to a W2 after the collision. A deformation rate (W2/W1) before and after the collision can be set by an experiment or a simulation to the extent that the first fragile portion does not unintentionally damage other portions while being deformed with higher priority than the others.

Modification

It is noted that, in the embodiment, the example in which the driving mechanism 10 that is disposed such that a longitudinal direction thereof is along the vehicle longitudinal direction moves along the vehicle longitudinal direction to the front direction of the vehicle in the rear collision has been described. However, an installation aspect of the driving mechanism 10 and a method for moving the driving mechanism 10 to a safe space are not limited to the example.

Figure 7A:
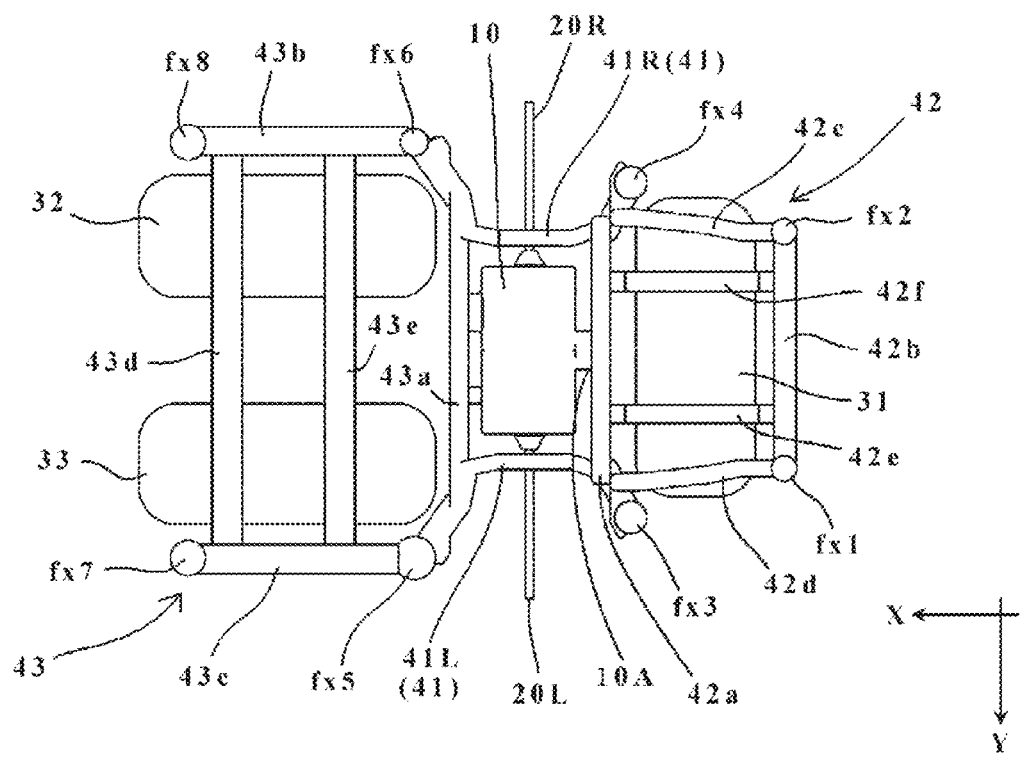
FIGS. 7A and 7B are external perspective views of a container holding mechanism in a fuel cell vehicle according to a modification.
Figure 7B:
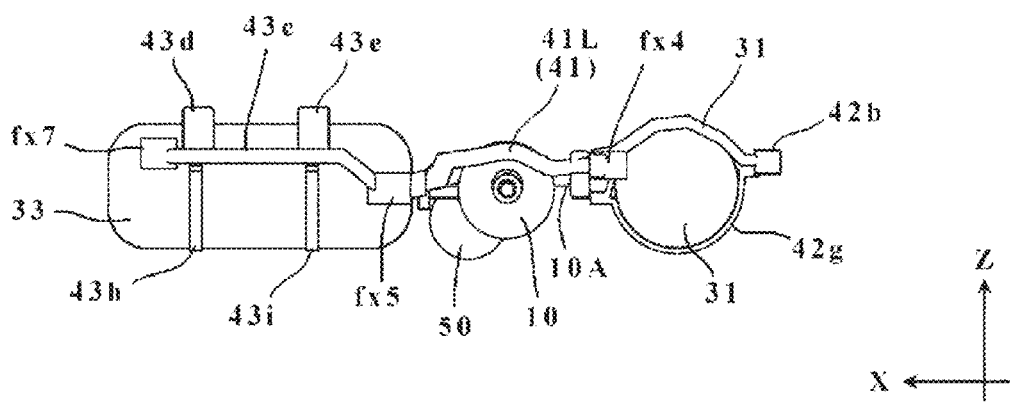
Figure 8:
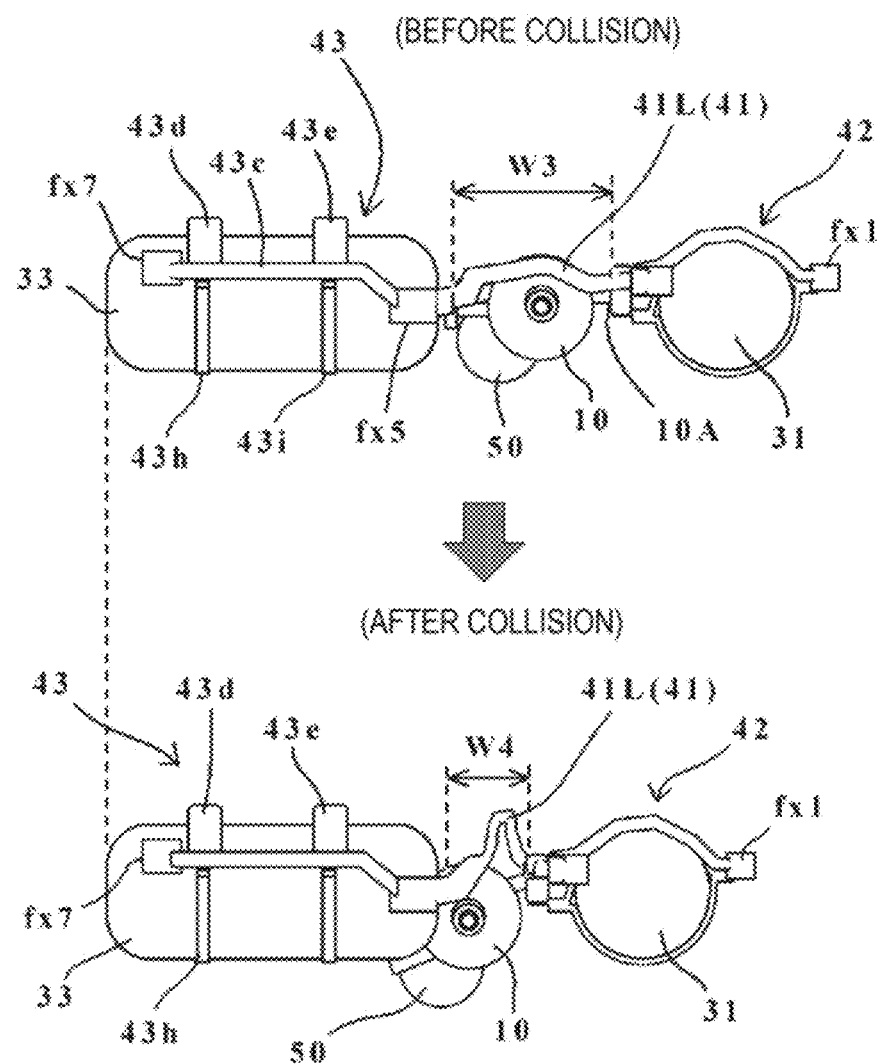
FIG. 8 is a schematic view illustrating state transition before and after the collision in the container holding mechanism in FIGS. 7A and 7B.

For example, such as a case of a container holding mechanism 110 illustrated in FIGS. 7A and 7B, the longitudinal direction of the driving mechanism 10 may be disposed along the vehicle width direction. Moreover, before and after the collision, the first hydrogen gas container 31 is pushed out forward and the first fragile portion (the first support 41) is preferentially deformed, so that the driving mechanism 10 is also pushed out forward by the amount of the deformation. At this time, as illustrated in FIG. 8, a length W3 in the vehicle longitudinal direction (the X direction) of the first fragile portion (the first support 41) changes to W4 after the collision. A deform rate (W4/W3) before and after the collision can be set by an experiment or a simulation, similar to the case.

With the container holding mechanism 110 indicated in the modification described above, in the rear collision, the first fragile portion (the first support 41) is primarily deformed, the driving mechanism 10 is pushed out to the front direction of the vehicle by the first hydrogen gas container 31 via the second support 42, and the driving mechanism 10 bends by the self weight using the rear support 10A as a starting point and slightly turns in a θy direction. At this time, for example, a guide may be provided in the tank mounting frame 40 such that the driving mechanism 10 slides into a slanting downward direction (in a +X direction and a −Z direction in FIGS. 7A and 7B).

It is noted that, the driving mechanism 10 in the modification is disposed such that the longitudinal direction thereof is along the vehicle width direction, so that, in addition to the effect described in the embodiment, it is possible to relatively reduce the predetermined gap (safe space) between the second hydrogen gas container 32 and the third hydrogen gas container 33, and increase a space efficiency as well.

Accordingly, similar to the embodiment, also in the modification, it is possible to prevent the structure other than the first fragile portion (the first support 41) in the container holding mechanism 100 from being largely deformed and being brought into contact with other components and the like. This can reduce a damage to the driving mechanism even when a rear collision unintentionally occurs.

The embodiments and modification examples of the disclosure have been described in detail with reference to the accompanying drawings. It is noted that the disclosure is not limited to such embodiments and modification examples. It is apparent that one skilled in the art to which the disclosure relates may attempt to further modify the embodiments and the modification examples within the scope of the technical ideas described in claims, and it is to be understood that those modifications also naturally fall within the technical scope of the disclosure.

The invention claimed is:

1. A container holding mechanism for a fuel cell vehicle, the fuel cell vehicle comprising a power transmission mechanism coupled to rear wheels of the fuel cell vehicle via driving shafts and first, second and third hydrogen gas containers, the power transmission mechanism being disposed between the rear wheels, the container holding mechanism comprising:
 a first support disposed above the driving shafts, the first support comprising a bridge member extending along a longitudinal direction of the fuel cell vehicle, the bridge member comprising a convex curved portion extending in an upper direction of the fuel cell vehicle;
 a second support disposed behind the driving shafts and coupled to a rearward end of the bridge member, the second support being configured to support the first hydrogen gas container so that the first hydrogen gas container is disposed behind the power transmission mechanism and so as to extend along a width direction of the fuel cell vehicle; and
 a third support disposed in front of the driving shafts and coupled to a forward end of the bridge member, the third support being configured to support the second and third hydrogen gas containers so that i) the second hydrogen gas container is disposed in front of the driving shafts and extending along the longitudinal direction of the fuel cell vehicle and ii) the third hydrogen gas container is disposed in parallel with the second hydrogen gas container in front of the driving shafts,
 wherein the first support is deformable at the bridge member such that, upon being subjected to an impact by a rear collision of the vehicle, a distance from the forward end to the rearward end of the bridge member becomes shorter.

2. The container holding mechanism according to claim 1, wherein
 the second hydrogen gas container and the third hydrogen gas container are spaced apart in the width direction of the fuel cell vehicle as to be disposed with a predetermined gap therebetween.

3. The container holding mechanism according to claim 2, wherein
 a deformation of the first support due to the rear collision impact causes the first hydrogen gas container to move forward, and the first hydrogen gas container moving forward causes at least a part of the power transmission mechanism to move into the predetermined gap.

4. The container holding mechanism according to claim 1, further comprising a tank mounting frame comprising the first support, the second support and the third support,
 wherein the tank mounting frame supports the power transmission mechanism, and
 each of the first hydrogen gas container, the second hydrogen gas container, and the third hydrogen gas container are mounted on a vehicle body member via the tank mounting frame.

5. The container holding mechanism according to claim 3, further comprising a tank mounting frame comprising the first support, the second support and the third support,
 wherein the tank mounting frame supports the power transmission mechanism, and
 each of the first hydrogen gas container, the second hydrogen gas container, and the third hydrogen gas container are mounted on a vehicle body member via the tank mounting frame.

6. The container holding mechanism according to claim 4, wherein, a deformation of the first support due to the rear collision impact causes the first hydrogen gas container to move forward, and the first hydrogen gas container moving forward causes the power transmission mechanism to move forward such that at least a part of the power transmission mechanism is positioned below the second hydrogen gas container and the third hydrogen gas container.

7. The container holding mechanism according to claim 4, wherein
 the tank mounting frame has a rigidity lower than a rigidity of the vehicle body member of the fuel cell vehicle.

8. The container holding mechanism according to claim 5, wherein
 the tank mounting frame further comprises a drive motor support that supports a drive motor coupled to the power transmission mechanism.

9. The container holding mechanism according to claim 5, wherein
 the tank mounting frame has a rigidity lower than a rigidity of the vehicle body member of the fuel cell vehicle.

10. The container holding mechanism according to claim 4, wherein
 the tank mounting frame further comprises a drive motor support that supports a drive motor coupled to the power transmission mechanism.

* * * * *